United States Patent Office 3,631,060
Patented Dec. 28, 1971

3,631,060
PROCESS FOR TREATING 4(5)-NITROIMIDAZOLES
William A. Sklarz, Clark, and Albert D. Epstein, Edison,
N.J., assignors to Merck & Co., Inc., Rahway, N.J.
No Drawing. Filed Dec. 23, 1968, Ser. No. 786,414
Int. Cl. C07d 49/36
U.S. Cl. 260—309                          8 Claims

ABSTRACT OF THE DISCLOSURE

The purity of 4(5)-nitroimidazoles is improved by maintaining dilute, spent nitration reaction mixture at an elevated temperature for a period of time sufficient to destroy undesirable reaction by-products.

BACKGROUND OF THE INVENTION

Field of the invention

This invention relates to an improvement in the process for preparing 4(5)-nitroimidazoles and more particularly pertains to a process for recovering a purer 4(5)-nitroimidazole product from spent nitration medium that has been obtained by previously known methods.

Description of the prior art

Nitroimidazoles are very important and useful articles of commerce. 4(5)-nitroimidazoles are particularly useful as intermediates in chemical synthesis of well-known and useful compounds and as antibacterial and antiprotozoal agents. The preparation of 4(5)-nitroimidazoles by nitration with a hydrous mixture of nitric and sulfuric acid followed by quench on ice is well known. We have recently found that nitration with an excess of sulfur trioxide present during the entire nitration improves the conventional yield of 4(5)-nitroimidazole compounds.

A major problem in preparing 4(5)-nitroimidazole compounds by conventional mixed acid nitration or by nitration in the presence of excess sulfur trioxide, is the formation of by-products produced during the nitration reaction which reduce the chemical purity of the recovered product. These impurities are undesired and require careful purification of the recovered product generally by multiple recrystallizations, which is time-consuming and expensive.

SUMMARY OF THE INVENTION

The general purpose of this invention is to provide a safe, easily controlled process for preparing 4(5)-nitroimidazole compounds having better purity on recovery from the spent nitration reaction medium than has heretofore been possible. Improved purity is obtained by diluting with water, if necessary, and maintaining the diluted spent reaction mixture at an elevated temperature for a period of time sufficient to destroy the unwanted by-product.

Preferably the reaction mixture is allowed to boil, which in addition to destroying unwanted impurities also efficiently removes heat of dilution and neutralization and thereby reduces process cooling requirements. The hot treatment or quench may be part of the batch or continuous system.

An object of the present invention is to provide improved 4(5)-nitroimidazole purity by subjecting dilute spent nitration reaction mixture to elevated temperature conditions prior to product recovery.

Another object is to provide a quenching step which removes heat by vaporization and reduces process cooling and equipment costs.

DESCRIPTION OF THE PREFERRED EMBODIMENTS

In accordance with our invention we have found that the purity of nitrated imidazoles is improved by subjecting the spent nitration reaction mixture to a water dilution to dissolve all salts formed by simultaneous or subsequent partial neutralization and further by heat treatment of the reaction mixture for a period of time sufficient to improve purity.

Representative of the imidazole compounds prepared and treated by the process of this invention are 1(3)-unsubstituted-4(5)-nitroimidazoles represented by the general formula

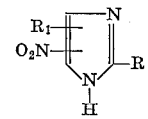

where R and $R_1$ may be the same or different radicals selected from the group consisting of hydrogen; halo such as iodo, bromo, chloro or the like; alkyl such as methyl, ethyl, isopropyl, butyl, hexyl or the like; aralkyl having 1–10 carbon atoms such as phenethyl, benzyl or the like; aryl such as phenyl, nitrophenyl, chlorophenyl, carboxamidophenyl and alkaryl having 1–10 carbon atoms such as tolyl, xylyl or the like.

Nitration of the imidazole compounds having a hydrogen atom attached to at least one of the 4 or 5-ring positions and having the remaining ring positions either substituted or unsubstituted, may be accomplished in the conventional manner by treating with an aqueous solution of mixed nitric and sulfuric acids. Preferably, however, fuming acids are employed to improve yield. For best yield, an excess of 10% by weight sulfur trioxide is employed, although greater or lesser amounts give good yield provided an excess of sulfur trioxide is present during the entire nitration.

Nitration is normally accomplished between the temperature of 20°–170° C. preferably between 50°–120° C. for a time of up to 24 hours, although less than 30 minutes is normally sufficient at higher temperatures to complete nitration.

The imidazole is preferably mixed in acid and combined with a nitrating mixture containing nitric acid and oleum or other sulfur trioxide-sulfuric acid source. The proportions and concentrations of reactants are controlled to obtain a calculated initial reaction mixture which will contain an excess of free sulfur trioxide after 100% nitration. Reaction occurs on combining the imidazole compound and the nitration mixture to yield the corresponding 4(5)-nitroimidazole derivative. After nitration is completed, the reaction mixture is quenched and base is added to precipitate the 4(5)-nitro substituted compound which is collected, washed and dried.

An acid mixture of the imidazole compound is often prepared to prevent decomposition which occurs if imidazoles are added directly to the nitration mixture. The mixture is prepared by adding the imidazole compound to acid, for example sulfuric or nitric. From 1–3.5 ml. of acid per gram of the imidazole is employed. Concentrated acid is preferably employed to reduce the quantity of free water available for reaction with sulfur trioxide in the final reaction mixture. Normally from 1.0–2.7 ml./gm. of the imidazole of concentrated (98%) sulfuric acid is employed with 1.2–2.0 ml. preferred. 1.4 ml. of sulfuric acid gives a good concentrated solution. Ideally, a low ratio of concentrated acid to imidazole is employed to minimize water dilution of the reaction mixture. If desired, hot solutions may be employed to form highly concentrated solutions. Phenyl substituted imidazole compounds are not necessarily pre-dissolved in acid before nitration, since the phenyl compounds do not usually decompose.

The nitrating mixture is prepared by combining nitric acid with oleum, sulfan B in oleum, anhydrous sulfur trioxide in concentrated sulfuric acid, or other $SO_3$ containing source. White fuming nitric acid (>90%) is preferred to prevent dilution of the final reaction mixture by water present in the acid. Red fuming nitric acid, containing an excess of $NO_2$, may be employed if desired. Oleum is normally employed as the sulfur trioxide source with 65% oleum preferred to maximize the $SO_3$ content of the reaction mixture.

The amount of sulfuric acid employed in the nitrating mixture is normally in excess of one mole of sulfuric acid per mole of the imidazole compound to be nitrated. The exact proportion is not critical, although 5 moles or more of acid may tend to introduce an undesirable amount of water, even where concentrated acid is employed.

The amount of nitric acid employed in the nitrating mixture is normally slightly in excess of that necessary for the nitration. Thus, it is sufficient if there is present in the nitrating mixture about 1.1–1.5 moles of nitric acid per mole of the imidazole compound to be nitrated. When nitrating phenyl-substituted imidazoles the quantity of nitric acid is at least doubled where nitration of the phenyl radical is also expected.

A sufficient amount of oleum, sulfan B or other sulfur trioxide source, is used in the nitrating mixture so that there is excess sulfur trioxide present in the reaction mixture after nitration (assuming 100% nitration).

On completion of the nitration step the reaction mixture would normally be quenched on ice or into ice water to react with any excess $SO_3$ and to dilute the mixed acids and to cool the reaction mixture. We have found that this step is not necessary and, in fact, that it is desirable to maintain diluted reaction mixture at elevated temperature.

We have found that product purity is improved by maintaining the diluted reaction mixture at elevated temperatures up to and including boiling. This is readily accomplished by utilizing the heat of reaction of $SO_3$ and water, the heat of dilution of the mixed acids and the heat of neutralization to elevate the diluted reaction mixture's temperature for a period of time at least sufficient to improve purity. Normally, less than 24 hours is sufficient.

The hot quench is accomplished by diluting the reaction mixture with sufficient water to lower the concentration of sulfuric and/or nitric acid to below 20% by weight of the water present in the diluted mixture.

The addition of water causes generation of heat which elevates the spent reaction mixture's temperature and may cause boiling. Boiling is preferred, contrary to the teachings of the prior art, to improve purity by destroying unwanted by-product and to remove heat by evaporation of water without the need for expensive process cooling equipment or brines.

To effect further process economies, and to improve process control, the reaction mixture is discharged into previously diluted reaction material with simultaneous addition of water to insure a concentration of acid below 20% by weight. Sufficient additional water is added if necessary to insure dissolution of all water-soluble salts.

Of course, if desired, the reaction mixture may be diluted with cold water or ice and subsequently heated for a period of time sufficient to improve purity.

4(5)-nitroimidazole compound is recovered as a precipitate by adding base, for example ammonia, methylamine, sodium hydroxide, potassium hydroxide or the like to the quenched reaction mixture. The amount of alkali is about equivalent to the amount of acid present. However, this amount is not critical provided a pH of equal to or greater than one is achieved. Conveniently the base is pre-diluted with sufficient water to dissolve the salts formed on neutralization.

If desired, base is added after or simultaneously with the dilution step. For example a dilute ammonia solution is mixed with the hot, spent nitration reaction mixture, both diluting and essentially neutralizing the reaction mixture. The neutralization, in addition to precipitating product, further elevates the mixture's temperature above that caused by dilution, which in many cases causes boiling of the mixture. Maintaining the diluted, spent reaction mixture at elevated temperature improves the purity of the desired imidazole product. Obviously, the combined neutralization and quench may be employed in either a batch or continuous process.

After quenching and partial neutralization to $\geq pH\ 1$ with alkali to precipitate the imidazole compound, the mixture is cooled to 25° C., centrifuged, washed with water until free of acid and dried.

For products that are more insoluble, such as 2-phenylimidazole, sufficient water is added to reduce the acid concentration to below 20% of the water present but no neutralization is necessary.

A preferred embodiment of this invention is the continuous hot quench and simultaneous partial neutralization of spent nitration reaction mixture. This technique lessens the inherent problems associated with the exothermic nature of the reaction and avoids hazards associated with the preparation of large batches of nitro compounds. The use of a continuous process step also allows the dilution and neutralization to proceed under more easily controlled conditions.

In the preferred embodiment of the continuous process, two reactant make-up and holding tanks, a reaction tank, and a quench and neutralization tank comprise the basic apparatus. The tanks are suitable of corrosion-resistant type, and are equipped with a cooling jacket and/or coils and mixing unit. The two reactant make-up and holding tanks are connected to the reaction tank by suitable means so that the reactants may be added continuously in measured amounts. A nitric acid-sulfuric acid mixture containing excess sulfur trioxide (nitrating mixture) and an imidazole-acid mixture are prepared batchwise or continuously as a matter of convenience.

The two reactant tanks are charged respectively with the imidazole-acid mixture and the nitrating mixture. To effect nitration, the two mixtures are admitted to the reaction tank in metered amounts so that the proper nitric acid-imidazole ratio, i.e. 1.1–1.4 moles of nitric acid per mole of imidazole, is present to effect nitration, and an excess amount of free sulfur trioxide is present in the reaction mixture during the entire nitration to provide improved yield.

Nitration employing a nitric-sulfuric acid continuous system containing free water could be employed, if desired, but yield would be reduced.

The product stream is removed from the reaction tank continuously at a rate sufficient to maintain a constant volume in the tank. The product stream is directed into a quench tank, with dilution water, where the reaction mixture is preferably quenched in boiling previously quenched material. Alkali is added continuously to the diluted reaction mixture to cause precipitation of the 4(5)-nitroimidazole compound. Sufficient quenched and neutralized material is removed from the quench tank continuously to maintain a constant volume in the tank. The removed suspension is filtered and the recovered product washed and dried.

Alternatively, alkali may be added subsequent to the quench at any temperature up to boiling.

The particular equipment used is not critical with respect to the invention. Vacuum or pressure tanks could be employed if desired to either increase or decrease the boiling temperature. However, it will be appreciated by those skilled in the art that the equipment must satisfy certain technical requirements, depending upon various flow rates, the heats of dilution and reaction, rate of withdrawal of the product, and the like. These requirements, however, are the normal requirements and may be calculated by well-known techniques.

The following examples illustrate methods of carrying out the present invention, and are given for the purpose of illustration, and not by way of limitation.

EXAMPLE 1

A nitrating solution consisting of nitric acid and oleum is prepared by placing 68.3 ml. of 65% oleum in a three-necked 500 ml. flask fitted with a stirrer, nitrogen inlet and outlet, addition funnel, thermometer, and a drying tube. The flask is cooled in an ice bath and 23.6 ml. of 98% nitric acid is added, with stirring, while maintaining the temperature below 50° C. An imidazole-acid solution is prepared by dissolving 26.2 g. of solid imidazole in 43.6 ml. of 98% sulfuric acid, with stirring and cooling, so that the temperature does not exceed 50° C. The two solutions are combined over a two-hour period, with stirring and cooling, maintaining the temperature at about 50°–60° C. On completion of the addition, the reaction mixture is aged for one hour at 50°–60° C. and subsequently quenched into 150 g. of ice. The reaction mixture is then adjusted with 302 ml. of concentrated ammonium hydroxide, filtered at 25° C., and washed with water. A 91.3% yield of 4(5)-nitroimidazole, M.P. 302°–304° C., is obtained having a purity of 95%.

When the aforementioned procedure is repeated replacing the ice quench employed in Example 1 with a quench into water, with subsequent boiling of the aqueous mixture for one hour, corresponding yields of 4(5)-nitroimidazole, M.P. 306°–307° C., are obtained having a purity of 98%. Under larger scale conditions, when nitroimidazole spent nitration reaction mixture is diluted and boiled on a continuous operation basis or in a batch for about 14 hours, purities exceeding 99% are obtained.

EXAMPLE 2

An imidazole-acid solution is prepared by adding 174 lbs. of 98% sulfuric acid in a 100 gallon glass-lined vessel. The imidazole (66 lbs.) is slowly added to the 98% sulfuric acid, agitating and cooling the reaction mixture so that the temperature is maintained below 50° C. The nitrating mixture is prepared by adding 89.5 lbs. of 98% nitric acid to 349 lbs. of 65% oleum in a 100 gallon glass-lined vessel, with mixing and cooling to maintain a temperature of 50°–60° C. during the addition. The imidazole solution in sulfuric acid and the nitrating mixture are fed at rates of 0.175 gal. per minute and 0.258 gal. per minute respectively into a stainless steel stirred reactor with sufficient cooling to maintain the temperature at approximately 90° C. The temperature of the mixed acids is maintained above 90° C. during addition to the reactor to prevent precipitation of solid complexes in the feed stream. Simultaneously, an amount of nitrated product equivalent to the total amount of material entering the reaction tank is removed and passed into a quench tank at reflux. Water (46 gal.) and 88 gal. of NH₄OH are admitted into the quench tank along with the nitrated product and the mixture is allowed to boil for 14 hours to dissipate the heat evolved and to destroy impurities. The neutralized product is then cooled to 25° C., centrifuged, and washed with water until acid-free, yielding 101 lbs. of 4(5)-nitroimidazole, M.P. 307°–309° C., 99% pure.

What is claimed is:

1. In the process for the preparation of a nitroimidazole compound having the formula:

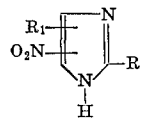

where R and $R_1$ are the same or different and are hydrogen, halo, alkyl of from 1 to 6 carbon atoms, phenethyl, benzyl, phenyl, nitrophenyl, chlorophenyl, carboxamidophenyl, tolyl or xylyl, which comprises treating a compound having the formula:

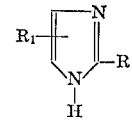

where R and $R_1$ are as previously defined, with a nitrating mixture of nitric and sulfuric acids, and diluting the reaction mixture with water at the completion of the reaction so that the combined acid concentration is less than 20% of the diluted reaction mixture, the improvement that comprises heating said diluted reaction mixture at about the reflux temperature thereof for a duration of from 1 to 24 hours.

2. The process of claim 1 in which the nitroimidazole compound is 4(5)-nitroimidazole.

3. In the process for the preparation of a nitroimidazole compound having the formula:

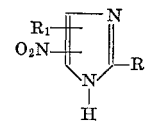

where R and $R_1$ are the same or different and are hydrogen, halo, alkyl of from 1 to 6 carbon atoms, phenethyl, benzyl, phenyl, nitrophenyl, chlorophenyl, carboxamidophenyl, tolyl, or xylyl, which comprises treating a compound having the formula:

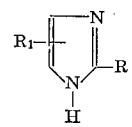

where R and $R_1$ are as previously defined with a nitrating mixture of nitric and sulfuric acids and sulfur trioxide, and diluting the reaction mixture with water at the completion of the reaction so that the combined acid concentration is less than 20% of the diluted reaction mixture, the improvement that comprises heating said diluted reaction mixture at about the reflux temperature thereof for a duration of from 1 to 24 hours.

4. The process of claim 3 in which the nitroimidazole compound is 4(5)-nitroimidazole.

5. In the process for the preparation of a nitroimidazole compound having the formula:

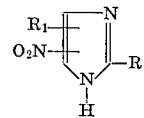

where R and $R_1$ are the same or different and are hydrogen, halo, alkyl of from 1 to 6 carbon atoms, phenethyl, benzyl, phenyl, nitrophenyl, chlorophenyl, carboxamidophenyl, tolyl, or xylyl, which comprises treating a compound having the formula:

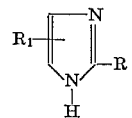

where R and $R_1$ are as previously defined with a nitrating mixture of nitric and sulfuric acids and diluting the reaction mixture with water at the completion of the reaction so that the combined acid concentration is less than 20% of the diluted reaction mixture, the improvement that comprises simultaneously diluting and neutralizing the reaction mixture with an aqueous base and heating said diluted and neutralized reaction mixture at about the reflux temperature thereof for a duration of from 1 to 24 hours.

6. The process of claim 5 in which the base is ammonia and the nitroimidazole compound is 4(5)-nitroimidazole.

7. In the process for the preparation of a nitroimidazole having the formula:

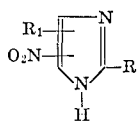

where R and $R_1$ are the same or different and are hydrogen, halo, alkyl of from 1 to 6 carbon atoms, phenethyl, benzyl, phenyl, nitrophenyl, chlorophenyl, carboxamidophenyl, tolyl, or xylyl, which comprises treating a compound having the formula:

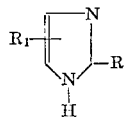

where R and $R_1$ are as previously defined with a nitrating mixture of nitric and sulfuric acids and sulfur trioxide and diluting the reaction mixture with water at the completion of the reaction so that the combined acid concentration is less than 20% of the diluted reaction mixture, the improvement that comprises simultaneously diluting and neutralizing the reaction mixture with an aqueous base and heating said diluted and neutralized reaction mixture at about the reflux temperature thereof for a duration of from 1 to 24 hours.

8. The process of claim 7 in which the base is ammonia and the nitroimidazole compound is 4(5)-nitroimidazole.

References Cited

UNITED STATES PATENTS

| | | | |
|---|---|---|---|
| 3,325,507 | 6/1967 | Kollonitsch | 260—309 |
| 3,399,211 | 8/1968 | Sarett et al. | 260—309 |
| 3,502,776 | 3/1970 | Hoffer et al. | 260—309 |

FOREIGN PATENTS

| | | | |
|---|---|---|---|
| 660,836 | 9/1965 | Belgium | 260—309 |
| 1,006,334 | 9/1965 | Great Britain | 260—309 |

OTHER REFERENCES

Cason et al.: Laboratory Text in Organic Chemistry, pp. 3–5, Englewood Cliffs, N.J., Prentice-Hall, 1950.

De la Mare et al.: Aromatic Substitution Nitration and Halogenation, pp. 48–50, N.Y., Academic, 1959.

Hazeldine et al.: J. Chem. Soc. (London), vol. 125, p. 1434 relied on (1924).

Hofmann: Imidazole and its Derivatives, Part I, pp. 127–8, N.Y., Interscience, 1953.

NATALIE TROUSOF, Primary Examiner

U.S. Cl. X.R.

260—688, 999